Dec. 23, 1941.  T. R. HARRISON ET AL  2,267,028
CONTROL INSTRUMENT
Filed June 13, 1939    3 Sheets-Sheet 1

INVENTOR
THOMAS R. HARRISON
HENRY M. SCHMITT
ATTORNEY

Dec. 23, 1941.   T. R. HARRISON ET AL   2,267,028
CONTROL INSTRUMENT
Filed June 13, 1939    3 Sheets-Sheet 2
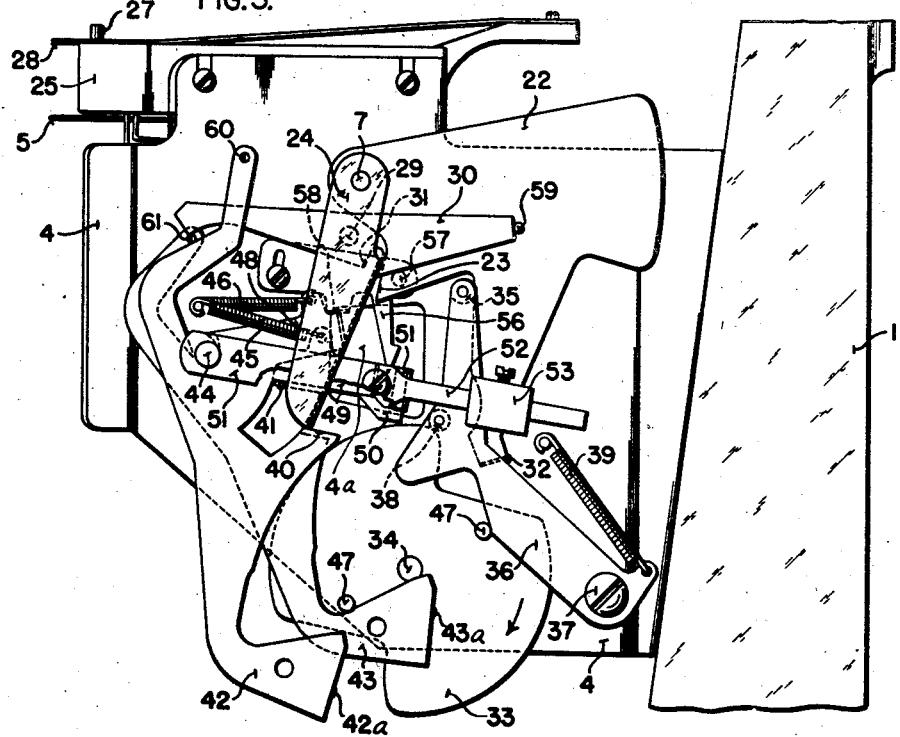
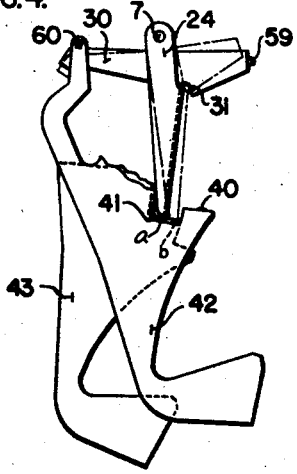
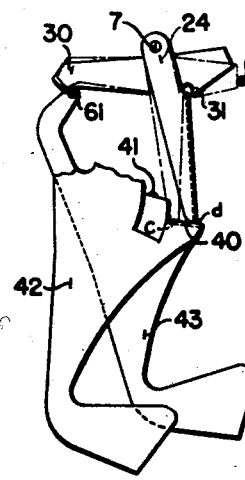
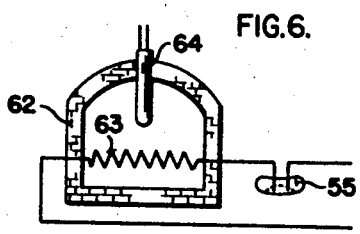
INVENTOR
THOMAS R. HARRISON
HENRY M. SCHMITT
BY George M. Murchant
ATTORNEY

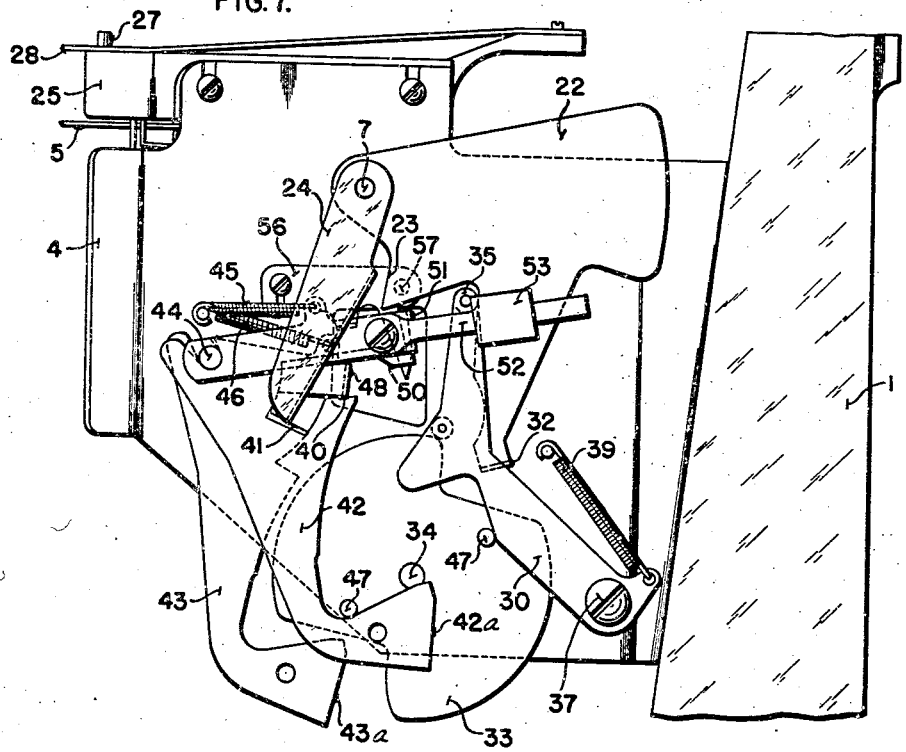
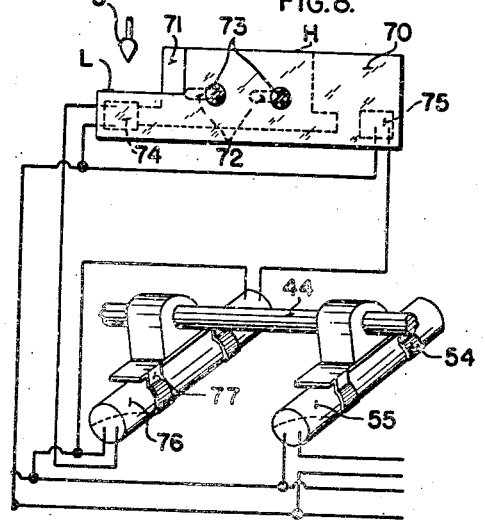
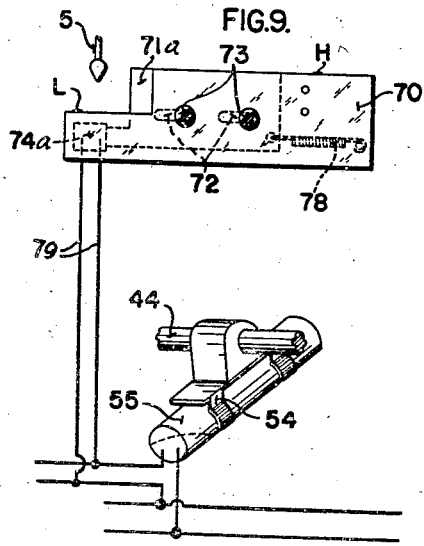

Patented Dec. 23, 1941

2,267,028

UNITED STATES PATENT OFFICE 2,267,028

CONTROL INSTRUMENT

Thomas R. Harrison, Wyncote, and Henry M. Schmitt, Philadelphia, Pa., assignors to The Brown Instrument Company, Philadelphia, Pa., a corporation of Pennsylvania Application June 13, 1939, Serial No. 278,866

13 Claims. (Cl. 236—70)

The present invention relates to control instruments and more particularly to those adapted to control the value of a condition, such as the temperature of a furnace, in such a manner as to prevent excessive over-shooting or hunting of the temperature with respect to a desired value thereof.

It is an object of our invention to provide a milli-voltmeter type of instrument which is adapted to maintain the temperature of a space at an approximately constant value. It is a further object of our invention to provide a control instrument of the "on-off" type that has the characteristic of anticipating changes in the value of the temperature from a desired value, and applying a correcting impulse to the medium controlling the temperature.

It has been customary, in instruments of the "on-off" controlling type, to turn on the supply of heat to the space whose temperature is being controlled when its value dropped below a certain point and to turn off the supply when the value rises to that point. This type of control gives rise to hunting or cycling of the temperature around the control point. While for some types of control this may be permissible, for other types it is highly undesirable and some extremely complicated instruments have been developed to overcome this condition. According to our invention we provide a simple control instrument in which an approach of the temperature from either direction toward the control point is utilized to control the heat input. In this manner an anticipating control is obtained in which the hunting is at a minimum for a two position control.

The various features of novelty which characterize our invention are pointed out with particularity in the claims annexed to and forming a part of this specification. For a better understanding of the invention, however, its advantages and specific objects obtained with its use, reference should be had to the accompanying drawings and descriptive matter in which we have illustrated and described a preferred embodiment of the invention.

In the drawings:

Fig. 3 is a view looking from the right of Fig. 1;

Figs. 4 and 5 are views showing various positions of the secondary pointer relative to the control levers;

Fig. 6 is a wiring diagram;

Fig. 7 is a side view of the instrument for use with a modified step table;

Fig. 8 is a diagrammatic view showing a different step table and control circuit; and Fig. 9 is another diagrammatic view of a third embodiment of the invention.

Figures 1, 2:
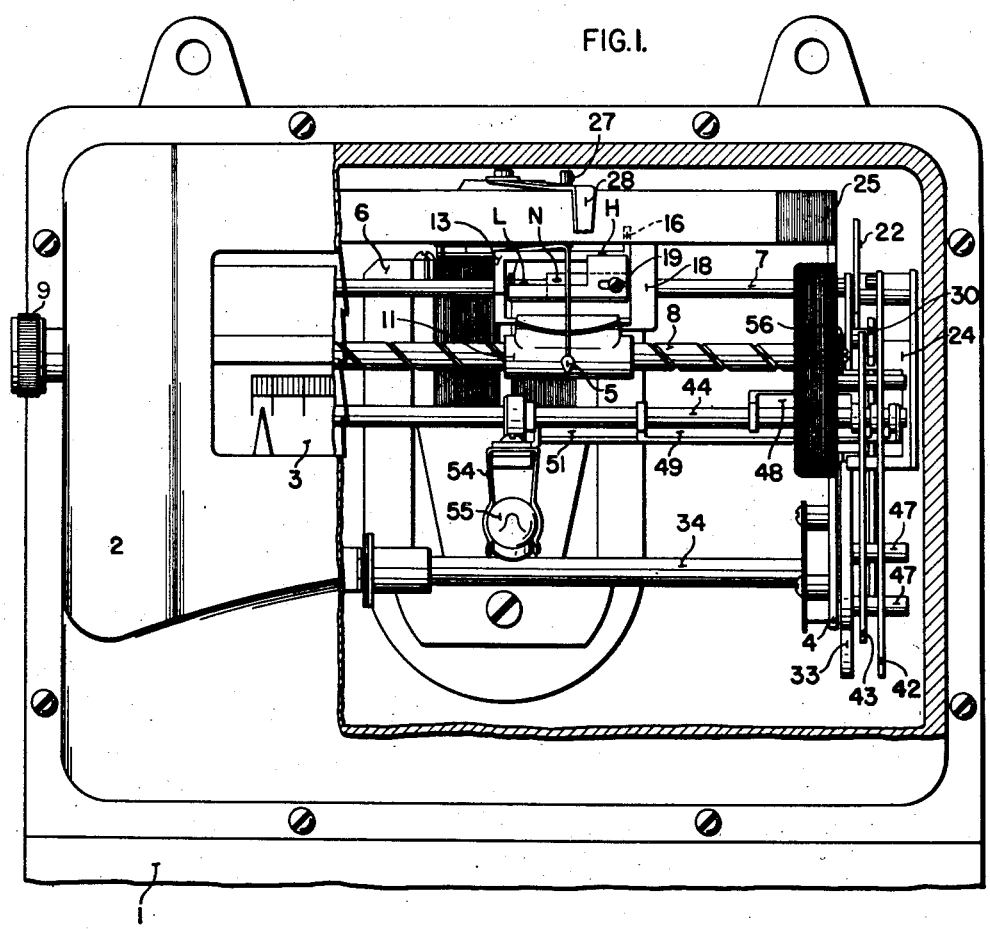
Fig. 1 is a front view of the control instrument with part of the cover broken away.
Fig. 2 is an end view of the pointer clamping mechanism.

Referring first to Fig. 1, there is shown a support 1 that is protected by a cover 2. The cover is provided with a window through which may be seen a scale 3 that is supported in position by wings formed on the side plates, one of which is shown at 4, the other being hidden by the cover.

Cooperating with the scale 3 to indicate the temperature is the pointer 5 of a galvanometer 6 that is responsive to the temperature being measured. The response may be made by connecting the galvanometer to a thermocouple subjected to the temperature being measured and controlled, in any usual manner. Means, to be described, are provided to sense the position of the pointer and through a mechanical relay position a switch to control the heat supply to the space whose temperature is being controlled.

Extending between the side plates of the instrument are two shafts 7 and 8, the latter of which is provided with a helical thread and may be rotated by a knob 9 which extends through the left side of the casing 2. Mounted on the shafts 7 and 8 for movement transversely of the instrument is a control table, the position of which determines the desired value of the temperature that is being controlled. The control table consists of member 10 provided at its lower end with a sleeve 11 encircling the shaft 8 and at its upper end with a yoke 12, the arms of which encircle the shaft 7. A projection on the interior of sleeve 11 is adapted to engage the thread on shaft 8 so that as the latter is rotated the member 10 will be moved across the instrument. Also and pivotally mounted for sliding movement on shaft 7 and between the arms of the yoke 12 is a clamping member 13 that is biased clockwise by a weight 14 and a step supporting table member 15 that has a natural counter-clockwise bias.

The front end (left in Fig. 2) of member 13 is provided with an upturned end 16 to limit the movement toward the right in Fig. 1 of the pointer 5. Member 13 is also provided with a downwardly extending hook member 17 that extends through an opening in the table member 15 and cooperating therewith so that 13 will be moved counter-clockwise with 15 but the latter may be moved clockwise with respect thereto.

Fastened to the front end of table member 15 is a plate 18 formed as shown in Fig. 1 with high step H and low step L. Adjustably mounted on this member is a neutral step N whose width may be varied by loosening the screw 19 and sliding the step N along the plate 18. The rear end of table member 15 is formed as a hook 20 that cooperates with a yoke member 21 fastened at its ends to the shaft 7. This yoke extends the entire length of the instrument between the side plates so that hook 20 may cooperate with it in any position of the control table.

Also attached to the shaft 7, outside of the side plate 4, is a plate 22 that is periodically permitted to move in a clockwise direction to rotate that shaft 7 and the yoke 21. This plate 22 is provided with an edge 23 that engages the rear face of a U-shaped secondary pointer 24 that is loosely mounted on the shaft 7.

The operation of the control table mechanism is as follows. As the plate 22 is permitted to move clockwise, by a cam to be described, it rotates shaft 7 and yoke 21. The yoke, through hook 20 moves table 15 clockwise against its natural bias. The clamping member 18 first engages the pointer 5 and clamps it against a pair of backing members 25 that extend between the side plates along the path of the pointer. Shortly after the pointer 5 is clamped one of the steps of the member 18 engages the pointer and is stopped in a position corresponding to the position of the latter. During this movement the secondary pointer 24 has been given a position proportional to the position of pointer 5 by the edge 23 of the plate 22.

An angle member 26 is fastened to the member 10 and extends upwardly between the backing members 25. A pin 27 projecting from its upper surface cooperates with an indicator 28 that may be pivoted concentrically with the pointer 5 to indicate on the scale 3 the position of the control table.

Pivoted to the secondary pointer 24 at 29 is a lever 30 that has a slot 31 placed over the cross piece of the secondary pointer. This lever is adapted to cooperate with a pin 59 projecting from the side of member 22 to adjust the secondary pointer relative to member 22, depending upon whether the controlled temperature is rising or falling, in a manner to be described.

The member 22, shaft 7 and yoke 21 are given periodic cyclic movements by means of engagement between an edge 32 of the member 22 and a constantly rotating cam 33 on a shaft 34 that is journaled in the side plate 4 and driven by any suitable motor (not shown). As a cutout portion of the cam 33 comes under the edge 32 of member 22, the latter moves slowly in a clockwise direction until it is stopped by the engagement of one of the steps on 18 with the pointer. Shortly thereafter member 22 is rapidly moved counter-clockwise to free the pointer by means of a roller 35 on the end of a lever 36. This lever is pivoted at 37 and moved into engagement with member 22 by means of engagement between a roller 38 mounted on it and the cam 33. The lever 36 is normally biased away from engagement with the member 22 by a spring 39.

Between the time the member 22, and secondary pointer 24 moved by it, reach their most clockwise position and the time roller 35 starts to move 22 counter-clockwise the secondary pointer is clamped in its position by means of steps 40 or 41 on levers 42 and 43, respectively, depending upon the position of the pointer. The levers 42 and 43 are pivoted at 44 and normally biased in a direction for their steps to engage the secondary pointer by means of springs 45 and 46, respectively. As the cam 33 rotates one of the pins 47 projecting therefrom engages the edges 42a and 43a to move the levers clockwise so that the steps 40 and 41 will be below the path of the end of the secondary pointer. Then, as the secondary pointer reaches its position, pin 47 rides off the edges 42a and 43a and permits the levers 42 and 43 to move upwardly and bring one of the locking steps 40 or 41 into engagement with the secondary pointer. If the condition is below normal pointer 5 will be engaged by step L and the secondary pointer will be engaged by step 41. If, however, the condition is above normal the pointer 5 will be engaged by step H and the secondary pointer 24 will be held in position by step 40, as shown in Fig. 3.

The spring 46 acts on the lever 43 through a yoke 48 that is attached to the lever. This yoke extends through an opening 4a in the side plate 4 and also has its inner end journaled for rotation on the shaft 44. In a like manner the spring 45 acts on the lever 42 through a second yoke 49, that also extends through the opening 4a and has its inner end journaled on shaft 44. The yoke 49 has attached to it a rearwardly extending finger member 50 that is adapted to engage the under side of the cross part of a third yoke 51 that has one of its ends pivoted on the shaft 44 outside of the lever 42 and has its other end pivoted on shaft 44 between the side plates of the instrument. Attached to the outer arm of the yoke 51 is a lever 52 which has an adjustable counterweight 53 on it to bias the yoke in a clockwise direction in Fig. 3. The inner arm of the yoke 51 has attached to it a support 54 for a mercury switch 55. This switch is open when the yoke 51 is in its clockwise position with the yoke resting on finger 50 as shown in Fig. 3, and is closed when the yoke 51 is moved counter-clockwise.

The yoke 51 is moved counter-clockwise to close the switch 55 when the finger 50 on yoke 49 is permitted to move upwardly by that yoke and lever 42. This occurs when the end of the secondary pointer 24 is to the left of the position shown in Fig. 3 and in engagement with step 41. When the yoke 51 is moved upwardly its cross piece comes over a gravity operated latch member 56 that is pivoted at 57 on the side plate 4 and is thereby held in its upper position. The latch is released to permit the yoke to move downwardly under the bias of weight 53 to open the switch by means of engagement between the yoke 48 and an edge 58 on the latch member as shown in Fig. 3 of the drawings.

The above operation is that effected by the ordinary "on-off" or two position controller and does not give an anticipating effect, nor does it take into account the neutral step N on the control table. When the pointer 5 is engaged by the neutral step N the switch 55 is opened if the temperature is rising and closed if the temperature is falling. This reverses the operation of the heat supplying means prior to the time the temperature has actually reached the control point from either direction, and is accomplished in the following manner.

To begin a description of the operation of this instrument assume that the temperature is low and that the right end of lever 30 is engaged by a pin 59 on the member 22. As the member 22 moves clockwise the pin 59 will engage the end of lever 30, attached to the secondary pointer 24, and move the latter to the full line position of Fig. 4 so that the end of the secondary pointer engages step 41 of lever 43 at the point a. This will permit lever 42 to rise until finger 50 engages yoke 51 and moves that yoke upward to a position in which it is held by latch 56. The switch 55 is now closed and heat is being supplied to the furnace. As the lever 42 moves upwardly a pin 60 projecting from its upper end will engage the upper surface of the left end of lever 30 and move the latter counter-clockwise around its pivot 29 on the secondary pointer so that its right end is no longer in engagement with pin 59.

If during the next cycle of the instrument the temperature is still low the secondary pointer 24 will again be moved to a position over the step 41. This time, however, the secondary pointer will be moved by engagement with the edge 23 of member 22 instead of by engagement between pin 59 and lever 30. As a consequence the secondary pointer will assume the position shown in dotted lines in Fig. 4 and will engage step 41 at point b. The reason for this is clearly shown in Fig. 3 wherein it will be seen that when lever 30 engages pin 59 the edge 23 will be to the right of the secondary pointer. Inasmuch as member 22 assumes the same position each time step L engages pointer 5, the secondary pointer will be moved to positions a or b depending upon whether pin 59 engages lever 30 or whether edge 23 engages the secondary pointer directly. For each subsequent cycle that the temperature remains low secondary pointer 24 will engage step 41 at b.

As the furnace temperature rises the pointer 5 will move to the right in Fig. 1 and will be above the step N. Since the step N is slightly higher than the step L the member 22 will not be able to move as far in a clockwise direction in Fig. 3 as it did previously. The parts are so proportioned that the end of the secondary pointer will engage edge 40 of lever 42 and permit lever 43 to rise. This, through the yoke 48 will release the latch 56 and permit yoke 51 to move downwardly and open switch 55 to reduce the heat supply. All subsequent cycles of the instrument in which the pointer 5 is over the step N will produce the same relation of parts and the switch 55 will remain open.

If the temperature continues to coast upwardly after the switch 55 is opened, as may well be the case, the pointer will be positioned over step H. In this case the member 22 will be stopped in its clockwise movement with edge 23 to the right of its previous position and the secondary pointer will engage step 40 of lever 42 at point d as shown in full lines in Fig. 5. During the clockwise movement of lever 43 a pin 61 projecting from its upper end will engage the lower surface of the left end of lever 30 and shift that lever so that on the next cycle of the instrument the right end of the lever will be in the path of pin 59. On the next cycle of the instrument and any subsequent cycles thereof in which pointer 5 is over step H the secondary pointer 24 will be moved to a position slightly to the left of that which it previously occupied and will engage step 41 at point c as shown in dotted lines in Fig. 5.

Since switch 55 has been opened the temperature will start to drop and pointer 5 will eventually be positioned over step N again. In this case the temperature is falling and as step N is lower than step H, member 22 will move further clockwise to position the secondary pointer 24 over step 41 of lever 43 at point b. Thus the switch 55 will be closed when the temperature drops enough to bring pointer 5 over the neutral step. During subsequent cycles of the instrument while pointer 5 is still over step N the same position of the parts will be assumed.

When, upon continued falling of the temperature, the pointer 5 is over step L, the member 22 will move the secondary pointer by means of lever 30 and pin 59 to position a. On the next cycle of the instrument the pin 60 on lever 42 will move lever 30 from in front of pin 59 and the secondary pointer 24 will engage step 41 at point b.

It is noted that when the pointer 5 is above the neutral step N and the secondary pointer engages either step 41 at point b or step 40 at point c the lever 30 will be so positioned that its left end will not be engaged by either of the pins 60 or 61. It is for this reason that the secondary pointer will continue to engage the steps 40 and 41 at the points described and will not be shifted from point b to a or from point c to d while the pointer 5 is above step N. The shifting of lever 30 occurs only when the pointer 5 is engaged by steps L or H.

If the temperature should, for some reason, rise enough for the pointer 5 to move to the right of step H in Fig. 1 the member 22 would not be stopped in its clockwise movement and the instrument would set the switch 55 for a low reading. To prevent this from occurring the upwardly extending finger 16 is provided on the clamping member 13 to positively prevent the pointer 5 from moving to the right in Fig. 1 beyond the step H.

There is shown more or less diagrammatically in Fig. 6 one manner in which the opening and closing of the switch may control the temperature of a space. In that figure a furnace 62 is shown provided with an electrical resistance heating coil 63. When the switch 55 is open the current is cut off and the furnace will cool down and when the switch is closed current will be supplied to the coil 63 and it will heat the furnace up. There is also shown a thermocouple 64 extending through the wall of the furnace. This thermocouple is to be connected to the galvanometer of the instrument so that the pointer 5 will register the temperature of the furnace. It will be obvious to those skilled in the art that the switch may be used to control the temperature of the furnace in other ways, such as controlling the operation of a motor driven valve in a fluid fuel supply line or controlling the operation of a stoker motor for a solid fuel burner.

In the embodiment of Figs. 7 and 8 the same result is accomplished in a slightly different manner. There is shown in Fig. 7 a side view of an instrument corresponding to that of Fig. 3 except that the parts which act to give the secondary pointer 24 two positions on each of the edges 40 and 41 of the switch actuating levers have been omitted. In this figure the same reference numerals are used for the corresponding parts and it is not believed that a detailed description of operation of the various parts is necessary. It might be stated, however, that when the low step of the control table engages the pointer 5 the edge 23 of member 22 will move the secondary pointer 24 until it is over edge 41 of lever 43. Thereafter when pin 47 rides past edges 43a and 42a the lever 42 will move counter-clockwise under the bias of spring 45 to move its yoke 49 with finger 50 into engagement with the yoke 51 that rotates the switch carrying shaft 44. Yoke 51 is therefore moved until it is locked in its counter-clockwise position by latch 56. If the pointer 5 is engaged by the high step, edge 23 of member 22 moves the secondary pointer over edge 40, and the lever 43 is permitted to move upwardly under the bias of spring 46. The yoke 48 attached to lever 43 will engage edge 58 of the latch to release it to permit the yoke 51, under the bias of weight 53, to move clockwise.

The manner in which the desired control action of this embodiment is obtained is more particularly disclosed in Fig. 8 in which there is shown a step table 70 to take the place of the table 18 of Fig. 1. This step table has low and high steps L and H as did the step table of Fig. 1 but the neutral step 71 instead of being of a height intermediate that of the L and H steps is equal in height to the H step. The member 71 is slidably mounted on the member 70 by means of slots 72 formed therein which surround pins 73 extending from the member 70. Mounted on one end of the step member 70 is a solenoid 74 and on the other end a solenoid 75, which, when energized, pull the neutral step member 71 toward its respective end of the member 70. The length of travel of the member 71 is from its extreme left position shown in Fig. 8 to a position in which its left edge coincides with the vertical edge between the L and H steps. The solenoids 74 and 75 are energized, respectively, when one or the other pairs of contacts located in the ends of a mercury switch 76 are closed. This switch is mounted on a bracket 77 that is also attached to and movable with the shaft 44 upon which the switch 55 is mounted. The arrangement is such that when the switch 55 is closed the contacts of switch 76 that control the solenoid are bridged by the mercury to energize that solenoid and move the step member 71 to the left. When switch 55 is open the contacts which control energization of solenoid 75 are closed and the member 71 is moved to the right.

In the operation of the instrument, assuming that the temperature is low enough so that pointer 5 is over step L of member 70, the switches will be actuated to the position shown in Fig. 8. This closes the contacts of the switch 55 to supply current to the heater coil 63, and closes the contacts in the front end of switch 76 to energize the solenoid 74 and move member 71 to the left. Upon each subsequent operation of the instrument in which the step L engages pointer 5 the switches will remain in this position.

As the temperature rises the pointer will move over the projecting edge of member 71. Since this member is of a height equal to that of step H, the various parts of the instrument will be moved to positions in which the switch 55 is opened, and the back pair of contacts in switch 76 are closed to energize solenoid 75 to move member 71 to the right. Upon the next cycle of the instrument, if the pointer 5 is still above the space which was occupied by member 71, the low step will engage the pointer and the switches and member 71 will be moved back to their position of Fig. 8. If, however, the temperature continues to rise the pointer will move over step H and the switch 55 will remain in its open position. Upon movement of the pointer down scale from the step H, the switch 55 will be closed when the pointer gets over the region occupied by step 71.

Thus it will be seen that when the pointer 5 is in its low or high position the switch 55 is closed or opened. When, however, the pointer is in the neutral zone, or that occupied by member 71 in its left position, the furnace current is turned off if the temperature is rising and on if the temperature is falling. When the pointer stays in the neutral zone for more than one cycle of the instrument the current to the furnace is alternately turned off and on to supply an average amount of heat to the furnace.

In Fig. 9 there is shown another embodiment of the invention which is similar in principle to that of Fig. 8. In this embodiment the member 71A, which forms the neutral step, is normally biased to the right by a spring 78 and is moved to the left against its bias by a solenoid 74A, corresponding to solenoid 74 of Fig. 8. The use of the spring 78 obviates the necessity of two switches on the shaft 44 as was the case previously.

In the operation of this embodiment, when the temperature of the furnace is low the switch 55 is closed as usual to supply current to heater 63. At the same time the solenoid 74A is energized by means of lines 79 which are in parallel with the lines leading to the heater. As the temperature rises enough to bring the pointer 5 over member 71A or the high step H of member 70 the switch 55 will be opened and simultaneously break the circuit to the heater 63 and the solenoid 74A. The spring 78 will then move member 71A to the right. In this manner the same mode of operation is obtained as was obtained with the structure of Fig. 8.

The above detailed description of operation of the various embodiments of the instrument makes it clear that when the value of the temperature is changing in either direction the supply of heat to the furnace is reversed prior to the time the actual value of the temperature has overshot the control point. In other words, when the temperature is rising the supply of heat is shut off before the value of the temperature has reached the desired point, and when the temperature is falling the supply of heat is turned on prior to the time the temperature has fallen below the desired value. In this fashion the change in temperature is reversed soon enough to prevent any appreciable overshooting from taking place. While with the two position type of control it is impossible to prevent some overshooting of the temperature, an instrument with the control characteristics set forth in this case will in many cases reduce the overshooting of the temperature fifty percent.

In the use of the instrument described the width of the neutral step will have to be adjusted in accordance with heat input and heat output characteristics of the furnace with which it is to be used. After this preliminary adjustment has been made, however, the instrument will continue to function indefinitely without further attention.

While in accordance with the provisions of the statutes, we have illustrated and described the best forms of our invention now known to us, it will be apparent to those skilled in the art that changes may be made in the form of the apparatus disclosed without departing from the spirit of our invention as set forth in the appended claims, and that in some cases certain features of our invention may sometimes be used to advantage without a corresponding use of other features.

Having now described our invention, what we claim as new and desire to secure by Letters Patent is:

1. In a measuring and control instrument, a two position switch, a mechanically actuated latch to hold said switch in one position, means to move said switch to a position in which it is held by said latch if the value of a condition is on one side of a predetermined value, means to release said latch and move said switch to the second of its positions if the value of said condition is on the other side of said predetermined value and means controlled by said switch actuating means to throw said switch to a below or above normal position as the value of said condition approaches said predetermined value from above or below the predetermined value respectively.

2. In a measuring and control instrument the combination with a control switch, a pair of levers to individually operate said switch in opposite directions, means responsive to the value of a condition to determine which of said levers will operate said switch, and means operated by said levers to cause the first means to assume different positions depending upon the attainment of a predetermined high or low value of said condition.

3. In a measuring and control instrument the combination with a control switch, a pair of levers to individually operate said switch in opposite directions, means responsive to the value of a condition to determine which of said levers will operate said switch, and means to shift said first means to cause operation of said switch by said levers in response to the trend of said condition as said condition approaches a predetermined value.

4. In a measuring and control instrument the combination with an element deflecting in response to the value of a condition, an oscillatable member, means to move said member into engagement with said element, the member assuming one of three positions depending upon its point of contact with said element, a second member positioned by said first member, a pair of control levers movable through a path limited by the position of said second member, and means to adjust said second member by said levers independently of said first member.

5. In a measuring and control apparatus, an element deflectable to a position proportional to the value of a condition, an oscillatory member periodically moved to a position determined by the position of said element, a pair of control levers, control means actuated in opposite directions by said levers, a secondary pointer positioned by said member to regulate movement of said control levers, and means acted upon by said levers to alter the position of said secondary pointer for a given position of said member.

6. In a measuring and control instrument the combination with an element deflectable to a position proportional to the value of a condition, a member periodically moving into engagement with said element at a point depending upon the position of the latter, means to move said member control means actuated in response to engagement of said element by said member, and means to operate said control means in one sense if the value of said condition is varying in one direction and to operate said control means in the opposite sense if the value of said condition is varying in the opposite direction due to the engagement of said member and element at the same point.

7. In a measuring and control instrument the combination with an element deflectable to a position proportional to the value of a condition, a cyclically operated member adapted to engage said element and assume one of three positions depending upon the point of engagement, control means, and means controlled by said member to operate said control means in one sense when said member assumes one position, to operate said control means in the opposite sense when said member assumes a second position and to operate said control means in either sense dependent upon the trend of said condition when said member assumes its third position.

8. In a measuring and control instrument, an element deflecting in accordance with the value of a condition, a member having a high, a low and a neutral step thereon, means to periodically move said member into engagement with said element whereby the former will assume a position depending upon which of its steps engages said element, control means movable to one of two positions depending upon whether said element is engaged by said high or low step, and means to move said control means to either of said positions when the neutral step engages said element.

9. In a measuring and control instrument the combination with an element deflecting in response to the value of a condition, a member having a high, a low and a neutral step located in the path of movement of said element, means to move said member into engagement with said element whereby the former will be stopped in one of three positions depending upon which step engages the element, control means movable to two positions, means to move said control means to one position when said high step engages the element, means to move said control means to its second position when the low step engages said element, and means depending upon the trend of the condition to permit operation of one of said moving means when the neutral step engages said element.

10. In a measuring and control instrument, the combination with an element deflecting in response to the value of a measurable condition, a control table movable periodically to bring a portion thereof into engagement with said element, means adapted to operate a control in accordance with the portion of said control table engaging said element, said control table presenting a stepped surface toward said element and a part slidable on said control table and cooperating with said surface to change the lengths of the steps thereof relative to said element.

11. The combination of claim 10 in which a pair of solenoids are mounted on said control table to act in opposite directions on said part, and means to energize one of said solenoids when said control is operated in one manner and to energize the other of said solenoids when said control is operated in another manner.

12. The combination of claim 10 including a spring to move said part in one direction and a solenoid to move said part in the opposite direction, and means to energize said solenoid as said control is operated in a predetermined manner.

13. In a measuring and control instrument, the combination with an element deflecting in response to the value of a measurable condition, a member movable periodically into engagement with said element, means adapted to operate a control in accordance with the portion of said member engaging said element, a part slideable on said member to change the engaging surface thereof relative to said element, a spring to move said part in one direction and a solenoid to move said part in the opposite direction, and means to energize said solenoid as said control is operated in a predetermined manner.

THOMAS R. HARRISON.
HENRY M. SCHMITT.